Feb. 7, 1950          A. BERTEA          2,496,849
VALVE
Filed Nov. 15, 1944          4 Sheets-Sheet 1
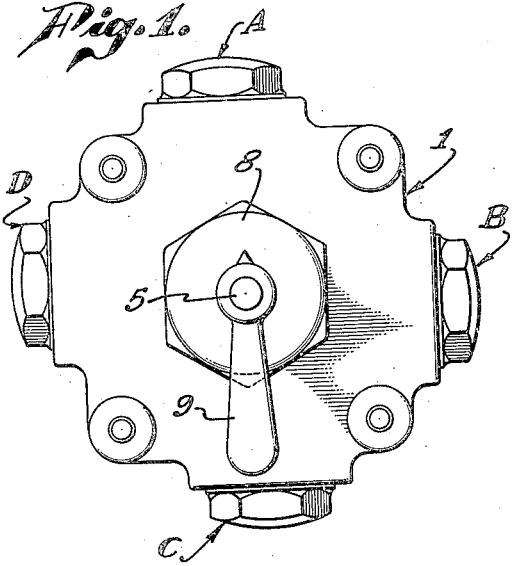
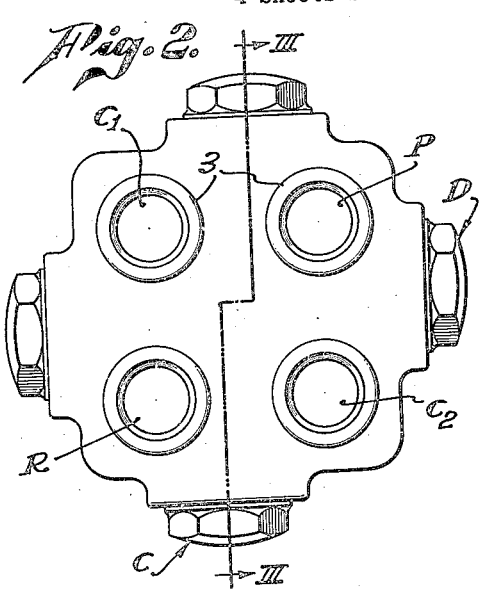
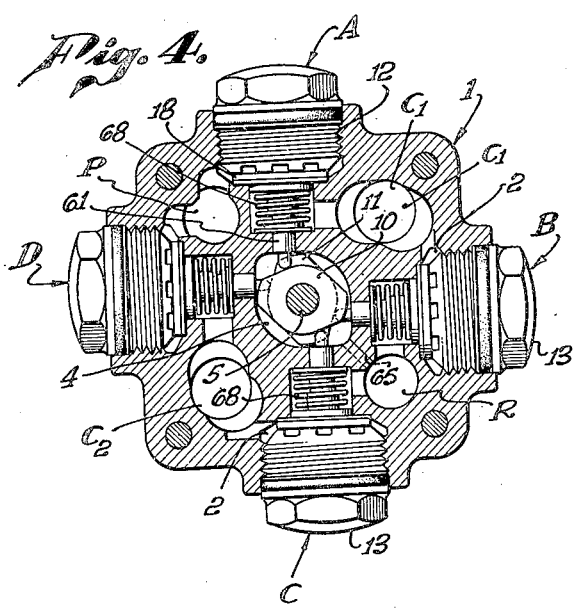
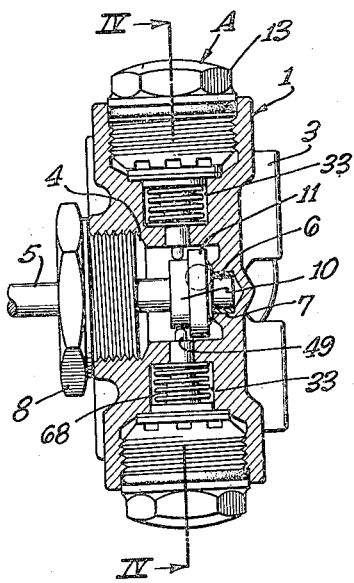
ALEX BERTEA,
INVENTOR.
BY
ATTORNEY.

Feb. 7, 1950

A. BERTEA 2,496,849

VALVE

Filed Nov. 15, 1944

ALEX BERTEA, INVENTOR.

BY

ATTORNEY.

Feb. 7, 1950   A. BERTEA   2,496,849
VALVE
Filed Nov. 15, 1944   4 Sheets-Sheet 3
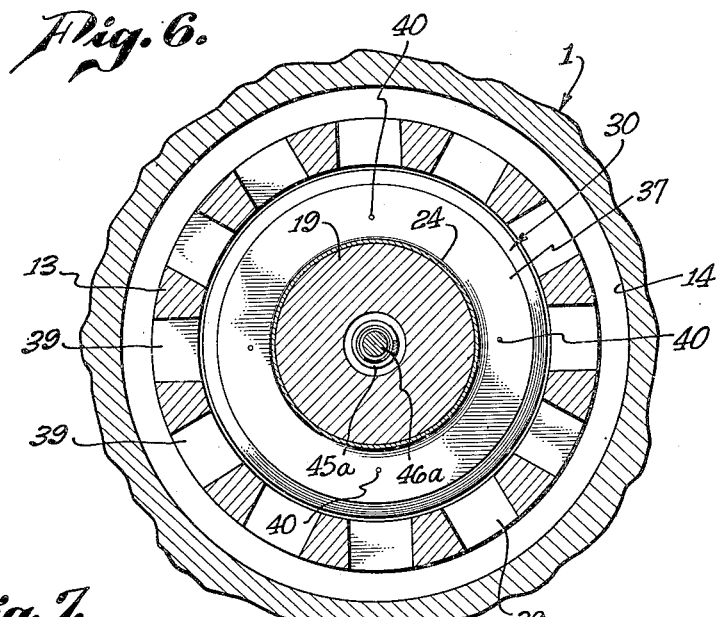
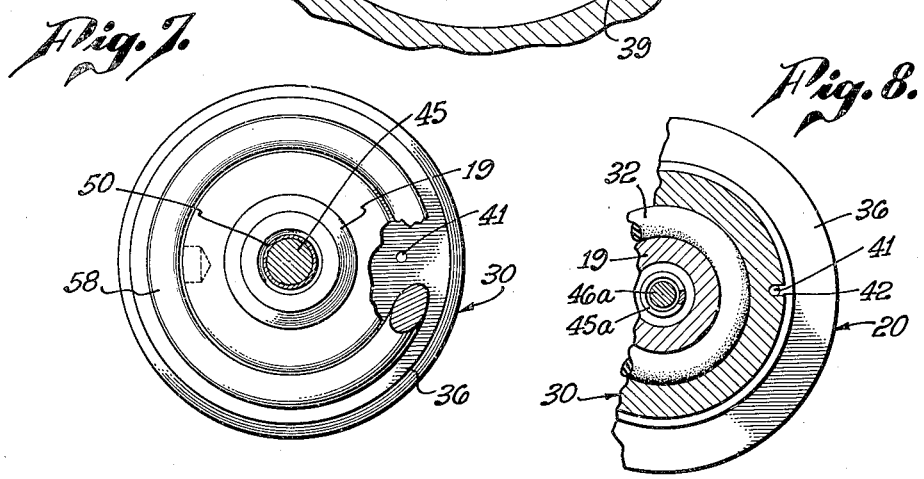
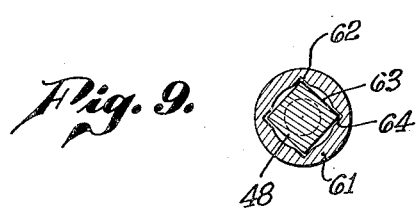
INVENTOR.
ALEX BERTEA,
BY
ATTORNEY.

Feb. 7, 1950  A. BERTEA  2,496,849
VALVE
Filed Nov. 15, 1944  4 Sheets-Sheet 4

INVENTOR.
ALEX BERTEA,
BY
ATTORNEY.

Patented Feb. 7, 1950

2,496,849

UNITED STATES PATENT OFFICE 2,496,849

VALVE

Alex Bertea, Pasadena, Calif.; H. Dexter McKay, executor of said Alex Bertea, deceased Application November 15, 1944, Serial No. 563,504

5 Claims. (Cl. 251—27)

My invention relates to improvements in valves employed to control the flow of hydraulic and pneumatic fluids and has particular reference to a valve structure which may be readily and inexpensively manufactured.

In the present day construction of valves employed for the control of pneumatic and hydraulic fluids, it is the usual practice to form a movable valve member and a seat against which such valve member closes as a unit; that is, in order to insure sealing of the valve member upon its seat it is necessary to lap the valve member upon the particular seat member with which it is to be associated since it is substantially impossible to so form the movable valve members and seat members independently of each other with any assurance that the valve member will make fluid tight seal with a seat with which it may be used.

Even after such fitting or lapping of the valve member with the particular seat with which it is to be used has been accomplished, the valve member and its seat are subject to warpage due to wear, change of temperature or other conditions which deform either the valve member or the seat sufficiently to prevent their making a fluid tight seal with each other after the valve has been put into use.

It is therefore one of the objects of my invention to provide a valve structure embodying a movable valve member and a seat with which it is to be used as independent entities and to avoid the necessity of lapping or otherwise fitting any particular valve member with its associated seat by employing an independent sealing member to accomplish the necessary fluid tight seal.

Another object of my invention is to provide a valve structure of the character set forth in the preceding paragraph wherein the sealing member is constructed as a relatively thin walled tubular element adapted to seat at its end upon the valve seat member but having sufficient flexibility laterally with respect to the seat such as will permit it to conform with any out-of-roundness or irregularity of the seating surface.

Another object of my invention is to provide a structure of the character set forth in the preceding paragraph wherein the flexible sealing member is mounted upon the movable valve member but is permitted a limited movement toward and away from the valve seat independent of the movements of the movable valve member.

Another object of my invention is to provide a valve structure of the character set forth wherein the flexible sealing member may be constructed to be actuated by either spring pressure of fluid pressure, or both, into its sealing relation with the valve seat member.

Another object of my invention is to provide a valve structure wherein the movable valve member is of the type in which the pressure of the fluid is employed to urge the movable valve member toward its seat and in which the flexible sealing member may be constructed as a separate member subjected to the fluid pressure as the means of urging it toward its sealing relation, the effective areas of the movable valve member and the flexible seal member being so proportioned as to allow any ratio of pressure to be effective upon the valve member and the sealing member.

It is another object of my invention to provide a valve structure of the type in which the movable valve member is urged toward its seat by fluid pressure exerted upon the movable member and in which the fluid pressure is required to pass upwardly through a portion of the movable valve member structure in order to exert upon the movable valve member the pressure urging it toward its seat, the passages provided for the upward flow of the pressure fluid constituting a filter to filter out debris from the fluid which is urging the valve member toward its seat.

By employing a movable valve member, a valve seat member and the flexible sealing member as set forth in the foregoing objects, it will be apparent that the lack of necessity for the selection of a particular movable member and a seat member particularly fitted thereto permits the selection from stock of movable members and seats for assembly with each other without requiring lapping or fitting operations to be performed when they are assembled.

It is therefore another object of my invention to provide a valve structure in which the valve body may be formed with one or more valve assembly receiving bores, into which the movable valve member, a seat member and a sealing member may be inserted or removed as a unit and in which any of the three associated members may be removed and replaced without requiring laborious and time-consuming fitting operations.

For many hydraulic power installations it is not only necessary that the valves employed be required to open to permit flow or close to shut off flow but also the degree of opening of the valve must be subject to selection to control the rate of flow of fluid through the valve.

It is therefore another object of my invention to provide a valve structure of the character set forth wherein a main movable valve member is employed to act upon a main valve seat member while a pilot valve structure is assembled upon the main movable valve member in such fashion that the pilot valve may be moved to any one of an infinite number of positions and the main movable valve member will move to a position relative to its seat corresponding to the amount of movement which has been given the pilot valve.

Other objects and advantages of my invention will be apparent from a study of the following specifications, read in connection with the accompanying drawings, wherein Fig. 1 is a front elevational view of a four-way valve assembly embodying the principles of my invention;

Fig. 2 is a rear elevational view of the valve shown in Fig. 1;

Fig. 3 is a vertical sectional view taken along line III—III of Fig. 2;

Fig. 4 is a vertical sectional view taken along line IV—IV of Fig. 3;

Fig. 6 is a transverse sectional view taken along the line VI—VI of Fig. 5;

Fig. 7 is a detailed transverse sectional view taken along line VII—VII of Fig. 5;

Fig. 8 is a fragmentary detail sectional view of a portion of the movable valve member shown in Fig. 5, said section being taken along the line VIII—VIII of Fig. 5;

Fig. 9 is a detail sectional view taken along line IX—IX of Fig. 5;

Figures 5, 5A:
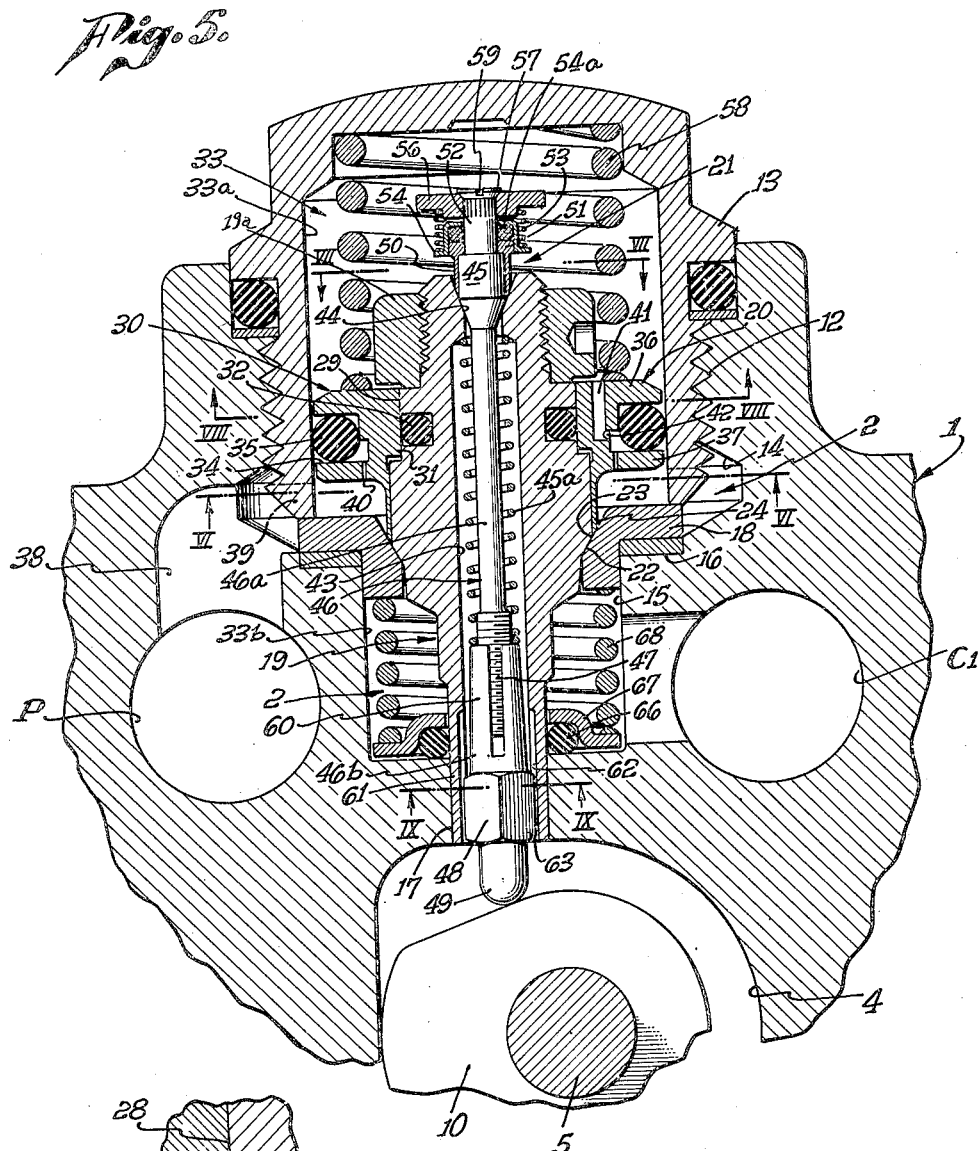
Fig. 5 is an enlarged vertical sectional view taken through one of the valve units which may be employed in the assembly shown in Figs. 1 through 4 and illustrating a main valve and pilot valve assembly with both the main valve and the pilot valve in closed positions.
Fig. 5a is a still further enlarged fragmentary sectional view of a portion of the valve seat, a portion of the movable valve member and a portion of the flexible sealing member.

Referring to the drawings, I have illustrated one form of valve assembly in Figs. 1 through 4 as a four-way valve adapted to control the flow of fluid to a hydraulic cylinder and piston mechanism in such fashion as to cause the piston to be moved to any position within its associated cylinder though it will be understood from the following description that the particular valve units which may be employed with the four-way valve so illustrated are equally adaptable for assembly in valve bodies providing for single-way or any multiple-way operation.

In the form of the structure illustrated in Figs 1 through 4, a valve body or housing 1 is constructed from a suitable block of material, the front and rear faces of which are roughly rectangular, providing four sides to the body, into each one of which extends a valve assembly receiving bore 2 while from the rear surface of the body there extends a plurality of fluid ports designated as a pressure port P, a return port R and two cylinder ports C1 and C2, these ports being adapted to be communicated, respectively, with a fluid line or pipe from a source of pressure, a return line or pipe returning exhaust fluid to the source of pressure and to lines or pipes communicating, respectively, with opposite ends of a cylinder or power device, the actuation in two directions of which is to be controlled by the valve. From an inspection of Fig. 3, it will be observed that the rear surface of the valve body 1 is formed with rearwardly projecting bosses 3 which may be threaded to receive the pipes or line fittings required for connecting the valve body to the various lines.

From the front surface of the valve body 1 in its approximate center extends an operating shaft bore 4, through which an operating shaft 5 may be inserted, the shaft having its inner end 6 disposed in a bearing 7, a suitable gland nut 8 being threaded into the bore 4 to hold the shaft 5 in place and to act as a forward bearing therefor.

The operating shaft 5 may be provided with suitable cams or levers by which the several valve units assembled in the valve bores 2 may be actuated in a desired sequence or order upon the rotation of the shaft 5 by any suitable means such as a handle 9. The particular arrangement shown in Figs. 1 through 4 is such that the valve units on the upper and lower sides are disposed in one plane extending transversely through the body so that the valves of these units may be actuated by one cam 10 while the valve units in the right and left-hand sides of the body are located upon a different transverse plane to be actuated by a second cam 11.

By referring particularly to Figs. 4 and 5, it will be observed that each of the valve receiving bores 2 is formed with a relatively large diameter adjacent the outer surface of the side of the body member immediately followed by a threaded portion 12 to threadedly receive a suitable cap or block member 13 adapted to hold the valve unit in place within the bore 2 while immediately below the threaded portion there is an enlarged diameter portion 14 below which is formed a reduced diameter portion 15, the junction between the larger and smaller diameters forming a radially extending shelf 16. Below the reduced diameter portion 15 the valve unit receiving bore 2 has a still further reduced diameter portion 17 communicating with the shaft receiving bore 4.

As will be hereinafter more fully described, the particular valve unit assemblies which may be inserted into the bores 2 may take different forms, one form being illustrated in Figs. 5 through 11 as comprising generally a valve seat member 18, a movable valve member 19 and a flexible sealing member 20 so constructed and arranged that the movable valve member 19 will in its closed position prevent flow of fluid through the bore 2 and when moved to an open position will permit the flow of fluid therethrough.

In the form of unit illustrated in Figs. 5 through 11, the movable valve member 19 is of the type in which fluid pressure exerted upon the up stream side of the valve will urge it toward closing position upon its seat member 18 and for the purpose of actuating the valve member 19 to its closed position or to any one of a number of open positions I utilize a pilot valve assembly 21 extending longitudinally through the movable member 19 and arranged to be actuated to any one of an infinite number of positions upon rotation of the cam 10.

While the movable valve member 19 and its seat member 18 may have any desired shape, I prefer to form the seat member 18 as an annular ring having a tapered seating surface 22 formed thereon adapted to engage a correspondingly tapered seating surface 23 formed upon the movable valve member 19. However, as distinguished from previous constructions wherein it has been necessary to lap and carefully fit the particular seating surfaces 23 on the movable member 19 with its associated seating surface 22 on the seat member 18, I prefer to construct the seat member 19 independently of the movable valve member 19 and independently polish, hone or otherwise finish the seating surfaces.

As will be understood by those skilled in this art, such independent finishing of the seating surfaces of the two valve members makes it substantially impossible for both of them to be truly round to the extent that the seating surface 23 will make a fluid tight seal with the sealing surface 22 and to permit the use of any one of a number of movable members 19 with any one of a number of seating members 18 I provide the separate sealing member 20 which includes in its construction a substantially tubular portion 24 of such thin-walled metal as to allow a flexibility to the tubular portion 24 whereby the lower edge 25 thereof may be flexed or distorted out of a true round shape to conform with any out-of-roundness or irregularities of the seating surface 22 and thus by reason of this flexible seal provide a fluid tight seal between the movable valve member and its seat member independent of the cooperation of the seating surfaces 22 and 23.

To insure that the flexible tubular seal portion 24 of the sealing member 20 will have sufficient latitude of movement relative to the movable valve member 19, the inner surface of the tubular portion 24 and the adjacent outer surface of the valve member 19 should be spaced slightly from each other at least immediately adjacent the level of contact between the end 24 of the seal and the seating surface 22. In Fig. 5a I have illustrated one way in which this may be accomplished as by forming the tubular portion 24 with a tapered inner surface 26 to provide a small space 27 at least at the lower end of the tubular portion 24. However, it will be apparent that the inner surface of the tubular portion 24 may have a uniform diameter while the adjacent surface of the movable valve member 19 may be tapered to provide the space 27 or both of the members may be made of uniform diameters but with a sufficient difference between them to provide the space 27 through which the end 25 of the sealing member may flex sufficiently to achieve a perfect seal against the sealing surface 22.

I prefer to form either the tubular portion 24 or the adjacent portion of the movable valve member with tapered surfaces so that the upper end of the tubular seal portion 24 will be in substantially close contact at all times with the movable valve member 19 so that when the sealing member 20 is subjected to great forces urging the sealing member downwardly upon the seating surface 22, the distribution of the forces will be such that the movable valve member 19 acts as a substantially rigid support, preventing the undue flexing of the tubular portion 24 at its upper end, as indicated at 28 in Fig. 5a.

I prefer to form the sealing member 20 of metal with a wall thickness along the portion 24 permitting it to flex from .012 to .015 inch without permanent distortion. However, I prefer to maintain the space 27 between the surface 26 and the adjacent surface of the valve member 19 so small as to limit the actual flexing movement well under such limits, namely, to within .004 to .005 inch so as to insure against the flexing of the tubular portion 24 beyond its limits of elasticity, it being seldom that the out-of-roundness of either the valve seat member 18 or the movable valve member 19 exceeds .005 inch. This limited flexibility is sufficient to permit of the tubular portion 24 to assume the necessary distorted shape to form the fluid tight seal.

Again referring to Figs. 5 through 11, it will be noted that in this form of valve unit the flexible sealing member 20 is mounted upon the movable valve member 19 but is permitted a limited longitudinal movement relative thereto to permit the flexible sealing member to assume the necessary position to provide the fluid tight seal independent of the fact that the seating surface 23 is already in contact with the seating surface 22. This may be provided by forming a reduced diameter portion 29 on the movable valve member 19 immediately above that part of the valve member along which the flexible seal portion 24 extends and the upper end of the flexible sealing member 20 may be constructed as a piston 30 having an inwardly extending flange 31 fitted to the reduced diameter portion 29 of the movable valve member 19. The length of the reduced diameter portion 29 is in excess of the longitudinal extent of the flange 31 so that a minute amount of longitudinal movement is permitted the sealing member 20. The sealing ring 32 is preferably interposed between the movable valve member 19 and the adjacent flange 31 of the piston 30.

In view of the fact that in the form of the valve shown in Figs. 5 through 11 the pressure of the fluid on the up stream side of the valve is employed to hold the movable valve member 19 in its closed position, the area of the smaller diameter portion 29 is subjected to the downward pressure of the fluid. This area, being in excess of the exposed area of the lower end of the movable valve member 19, will provide sufficient differential in the areas to permit the fluid pressure on the up stream side to press the movable member 19 down against its seat with sufficient force to insure effective closing of the valve.

At the same time it should be noted that the exposed area of the upper surface of the piston 30 is likewise subjected to the downward forces exerted by the pressure fluid, causing the sealing member to be urged toward its sealing relation. The effective area of the piston 30 exposed to this downward pressure, however, is limited to the difference between the diameter at the portion 29 and the external diameter of the tubular extension 24. Thus by properly relating the diameter of the portion 29 and the external diameter of the flexible tubular extension 24, any selected effective area may be provided and the total force which will be exerted urging the sealing member toward the surface 22 can be limited to any desired amount, dependent upon the pressures of fluid to which the valve will be expected to be subjected. For example, if the effective line pressure under which the valve is to operate is relatively high, say, in the order of 1000 pounds per square inch, the effective area may be limited to a minute fraction of a square inch and, while the total force will be sufficient to effect the sealing action, it can be maintained well within the limits of the strength of the tubular seal 24. For ease of manufacture, the upper end of the member 19 may be threaded to receive a nut 19a which will limit the upward movement of the seal 20 relative to the number 19.

By referring particularly to Fig. 5, it will be observed that the interior of the cap 13 is formed with a cylindrical bore 33 to constitute a cylinder as a part of the valve receiving bore 2 and in which the piston 30 operates, dividing the cylinder into an upper chamber 33a and a lower chamber 33b, the piston 30 being preferably formed with a radially extending groove 34, into which is fitted a sealing ring 35, the groove providing an upper flange 36 and a lower flange 37 disposed, respectively, above and below the seal 35.

Also it will be noted that the pressure port P communicates with the cylinder 33 at a point below the piston 30 by way of a passageway 38, which communicates with the enlarged diameter portion 14 of the valve assembly receiving bore 2.

The lower end of the cap 13 engages and holds the valve seat member 18 in place within the bore 2 and is provided with a plurality of slots 39 formed in the lower end of the cap 13 so that the incoming fluid will enter the bore 2 below the piston 30.

By referring particularly to Figs. 5 and 6, it will be noted that the flange 37 is provided with a plurality of ports 40 extending into communication with the groove 34 so that the incoming fluid may pass into this groove. Also by referring to Figs. 5 and 8, it will be noted that there is a bore 41 which extends from the upper surface of the flange 36 to a position well within the rear wall of the groove 34 and a small port 42 extending radially into communication with the bore 41 will permit the flow of fluid upwardly from the groove 34 to the upper side of the piston 30.

By forming the bores 40 of relatively small diameter and by forming the port 42 with a diameter such that the effective area of this port is equal to the sum of the areas of all of the ports 40, adequate communication is provided for the incoming pressure fluid from the under side to the upper side of the piston 30 but at the same time it will be noted that since the fluid can flow from the upper to the lower side of the piston 30, the pressure forces acting on the valve member 19 above and below the piston will be equalized except for that area of the piston which lies within the external diameter of the tubular seal portion 24. As thus far described, it will be apparent that the pressure fluid will urge the movable valve member 19 down upon its seat member 18 and will also urge the sealing member toward sealing relation.

As hereinbefore described, the form of valve shown in Figs. 5 through 11 includes the employment of the pilot valve assembly 21 by which the operation of the main valve member 19 may be controlled, this pilot valve structure taking the form of a longitudinal bore 43 extending through the movable valve member 19, the bore 43 having a reduced diameter adjacent the upper end of the member 19 formed with a tapered seat 44, against which seats a movable pilot valve member 45 mounted upon an operating stem 46 extending downwardly through the bore 43. The stem 46 is preferably constructed of two sections 46a and 46b, adjustable relative to each other to adjust the length of the stem as by threading the end of section 46a, as indicated at 47, and forming the section 46b as a nut 48, the lower end 49 of which rests upon and rides upon the operating cam 10.

Figure 10:
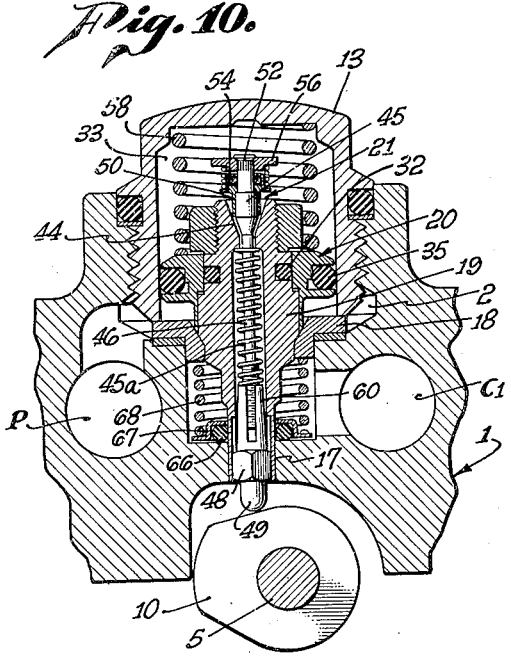
Fig. 10 is a vertical sectional view similar to Fig. 5 but illustrating the position of the valve parts when the pilot valve has just been opened.
Figure 11:
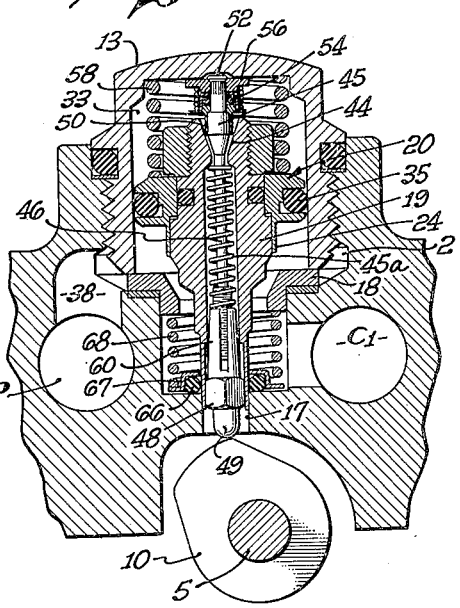
Fig. 11 is a vertical sectional view similar to Fig. 5 and illustrating the position of the valve parts when the main valve is in its fully open position.

Thus when the cam 10 is rotated in a clockwise direction, as viewed in Figs. 5, 10 and 11, the pilot valve 45 will be moved upwardly away from its seat 44 and thus permit fluid pressure in the cap bore 33 to pass downwardly through the bore 43 and to discharge into the recess formed about the cam by the operating shaft bore 4. The pressure forces above the piston 30 now being reduced while the pressure forces exerted by the pressure fluid upon the lower surface of the piston 30 will cause the movable valve member 19 to move upwardly from its seat 18. The distance, however, through which the valve member 19 will move will depend entirely upon the extent of the movement given to the pilot valve 45 since as soon as the upward movement of the valve member 19 is sufficient to so nearly re-close the pilot valve 45 upon its seat 44 as to restrict the flow of fluid through the pilot valve to the equal of the restricted flow through the piston ports 40, all further upward motion ceases.

If the biasing spring 58 is used, as hereinafter more fully described, to tend to urge the valve member 19 toward its closed position, it will be apparent that the flow of fluid through the pilot valve must be somewhat in excess of the flow through the ports 40 in order that the total pressure forces acting downwardly upon the valve member 19 will be equal to the total pressure forces exerted upwardly thereon.

When it is desired to re-close the valve, the handle 5 will be moved in the opposite direction so as to permit the pilot valve 45 to completely close, preferably aided by a biasing spring 45a, and the flow of fluid through the ports 40 will now build up greater pressure forces acting above the piston 30 and these forces will move the valve member 19 to its closed position.

Thus the operation of the movable valve member 19 may be readily controlled to provide any rate of flow between the movable member 19 and its seat 18 by determining the extent of upward movement of the pilot valve 45. In this way my valve not only acts as a means for opening and closing a fluid passageway to allow or prevent the flow of fluid therethrough but it may be used as a flow control valve by determining the position to which the valve member 19 will move away from its seat. By shaping that portion of the movable valve member 19 which extends into and through the seat 22, any desired flow curve may be achieved and any rate of flow between full open and full closed position of the valve may be accomplished.

If desired, the pilot valve 45, like the main valve 19, may be provided with a flexible sealing member 50 which may comprise a suitable supporting ring 51, from which depends a relatively thin-walled flexible tubular seal, as indicated in Figs. 5, 10 and 11. The flexible seal 50 is preferably mounted upon an extension 52 of the pilot valve 45 for limited longitudinal movement relative thereto so as to permit the seating of the valve 45 and the sealing of the flexible seal 50 independently of each other. The flexible seal 50 is normally urged downwardly along the pilot valve 45 by means of a suitable spring 53, one end of which bears upon a cup-like housing 54 surrounding the ring 51 while the other end of the spring 53 bears against a washer 56 pressed upon the extension 52, the upper end of the extension 52 being riveted over as indicated at 57 to hold the washer in place. A sealing ring 54a is preferably used between the extension 52 and the housing 54 to seal against leakage between the pilot valve 45 and its flexible seal 50.

While as hereinbefore described the main movable valve member 19 and its sealing member 20 are urged toward closed position by the pressure forces acting on top of the valve and sealing ring, the biasing spring 58 is preferably used to bias both the valve member 19 and its sealing ring 20 toward closed position to aid in closing the main valve. The spring 58 may be mounted with its lower end bearing upon the upper flange 36 of the piston 30 while the upper end of the spring engages the cap 13. Thus if during the operation of the valve there is but a slight differential in the pressures in the pressure port P and the outlet port or cylinder port C1, the spring will move the valve toward closed position until, by restricting a flow of fluid through the valve assembly, the pressure in the cylinder port C1 becomes sufficiently less than that in the pressure port P to permit the hydraulic pressure to complete the closing and sealing off of the valve.

The pilot valve 45 may be adjusted relative to its seat and relative to the operating cam 10 after assembly of the valve unit in the body by rotating the valve 45 and its shank 46 relative to the nut 48 as by providing a slot 59 in the upper end of the extension 52 by which the valve and its stem may be screwed up or down relative to the nut 48. In order to hold the pilot valve in its adjusted position after assembly, I prefer to provide that part of the nut 48 which threads upon the threads 47 as an elongated portion 60 slotted from its upper end, the several segments of the threaded portion being initially sprung inwardly slightly so as to insure a spring grip upon the threads 47.

Also to prevent rotation of the nut 48 and the pilot valve 45 relative to the movable valve member 19, I form an extension 61 on the lower end of the member 19 extending down through the reduced diameter bore 17 substantially to the lower end of this bore, the extension 61 being broached as indicated at 62 to receive a squared portion 63 of the nut 48, the broached portion being made either square or formed with notches 64 (see Fig. 9) disposed at 90° from each other to receive the corners of the squared portion 63 and prevent rotation of the nut relative to the extension 61 of the valve member 19.

With the form of valve unit illustrated in Figs. 5 through 11 disposed in the several valve unit receiving bores 2, it will be apparent from an inspection of Figs. 1 through 5, 10 and 11 that rotation of the handle 9 in a clockwise direction will cause the valve units A and C to open, such rotation causing the cam 10 to raise the pilot valves 45 of the units A and C through a distance dependent upon the extent of movement of the handle 9. Such operation is illustrated in Fig. 10, in which the cam 10 has just raised the pilot valve 45 from its seat 44. The bleeding off of the pressure which has been disposed above the valve member 19, reducing the pressure above the valve, will now permit the fluid pressure from the pressure port P to operate upon the piston 30 to raise the seal 20 from its sealing relation upon the valve seat member 18 and the movable valve member 19 will then rise from its seat until the seating surface 44 of the pilot valve again engages the pilot valve 45, at which time the valve member 19 will come to rest and the pressures above and below the piston 20 being now equalized, the valve member 19 will remain in this particular elevated position.

As shown in Fig. 11, if a greater flow of fluid from the pressure port P to the cylinder port C1 is desired, the handle 9 may be rotated still further in a clockwise direction to cause the cam 10 to raise the pilot valve to a still further elevated position and the main valve member 19 will move upwardly from its seat to assume a position corresponding to the position to which the pilot valve has been elevated. As shown in Fig. 11, if the pilot valve 45 is raised to its fullest extent, the main valve member 19 will also be moved upwardly to its fullest extent off of its seat 18 and the maximum flow of fluid to the cylinder 1 will be allowed.

While the valve unit A is being operated as just described, the valve unit C will similarly be operated to permit flow of fluid from the cylinder port C2 to the return port R so that if the valve is employed to control a piston and cylinder operating mechanism the fluid flowing through the cylinder port C1 will move the piston in one direction while the fluid in the cylinder on the opposite side of the piston will be permitted to exhaust to the return line through the valve unit C which has been opened to a flow rate corresponding to the flow rate selected for the valve unit A.

Similarly, movement of the handle member 9 in a counterclockwise direction will permit valve members A and C to close while valve units B and D will be opened to, respectively, permit pressure from the pressure port P to flow into and through the cylinder port C2 while the cylinder port C1 is communicated through the valve unit B with the return port R to move the piston in the opposite direction.

By utilizing the infinite number of positions of the handle 9 between valve closed position and the full open position of the respective valves, it will be apparent that any rate of flow through the valve structure may be provided, thus allowing any rate of movement of the piston and cylinder mechanism which may be desired.

Referring particularly to Fig. 4, it will be observed that the operating shaft bore 4 is ported as indicated at 65 to the return port R so that such of the fluid as bleeds down through the pilot valves 45 will pass into the bore 4 and thence pass to the return line.

Also it will be observed from an inspection of Fig. 5 that the lower portion of the valve unit receiving bore disposed below the seat 18 is sealed about the movable valve member 19 in such manner as to prevent inadvertent escape of fluids intended to flow through the main valve from escaping into the shaft bore 4, such seal comprising a sealing ring 66 disposed below a washer 67 which is in turn spring-urged downwardly by means of spring 68 toward the shoulder formed between the portions 15 and 17 of the valve unit receiving bore.

Also from an inspection of Fig. 4, it will be observed that the porting between the various valve units A, B, C, D and the respective ports P, C2, C1, and R is such that when the handle 9 is in its neutral or all valve unit closed position, the cylinder ports C1 and C2 are effectively prevented from actuating the valve units B and C to open position and thus into communication with the return line. Hence as long as fluid pressure from the pressure source is supplied to the pressure port P, the piston and cylinder mechanism will remain in whatever position it is located at the time the handle has been moved to neutral position.

Figure 12:
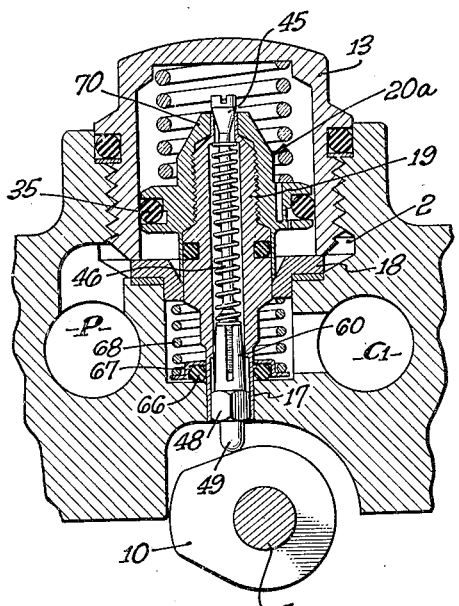
Fig. 12 is a vertical sectional view similar to Fig. 5 but illustrating a modified form of valve unit which may be employed in the practice of my invention.

In Fig. 12 I have illustrated a modified form of valve unit which may be substituted for the valve unit illustrated in Figs. 5 through 11, the primary difference in this valve unit being that the flexible seal member 20a is substituted for the flexible seal member 20, the seal member 20a being threaded upon the upper end of the movable valve member 19 and has an upwardly extending extension 70 which forms the support for the flexible seat portion of the moving member 19. In this form of construction the entire area defined by the largest diameter of the extension 70 comprises the effective area against which pressure from the pressure port P will be effective to urge the movable valve member 19 and its sealing member 20a into seating relation upon the valve seat member 18 and such structure may be found extremely desirable as a more simple construction for use in hydraulic systems operating under such low pressure as not to impose too great strains upon the sealing member 20a.

Figure 13:
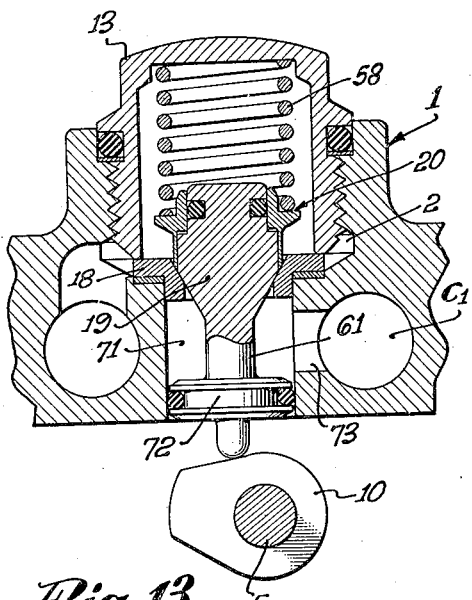
Fig. 13 is a vertical sectional view similar to Fig. 5 but illustrating a still further modified form of valve unit which may be employed in the practice of my invention.

In many instances it may be desired to use the valve units as a check valve to prevent movement of the piston and cylinder mechanism in the event of loss of pressure in the supply system. In such case a valve unit such as that illustrated in Fig. 13 may be employed wherein the valve receiving bore 2 is provided with a relatively large diameter section 71 below the valve seat 18 and a piston 72 of relatively large area may be formed upon the extension 61 of the movable valve member 19 disposed in the section 71 of the valve receiving bore below the port 73 which communicates with the cylinder port C1. Thus even though pressure from the supply line fails and no pressure is exerted upon the up stream side of the valve member 19, any attempt of the piston and cylinder mechanism to move will cause a back pressure to enter through the port C1 and impose its force upon the piston 72, tending to hold the valve member 19 in its closed position.

While for simplicity in the illustration and description hereof, the valve member 19 is illustrated as a mere poppet valve employing a sealing ring 20, it will be apparent that the piston arrangement 72 may be readily adapted to either of the forms of pilot actuated valves shown in Figs. 5 through 11 or Fig. 12, adding this additional back pressure operation to either of those forms of valve units.

From the foregoing it will be apparent that I have provided a valve structure in which valve units of the character described may be readily employed in suitable bodies containing one or more valve unit receiving bores to adapt the assembly to a one-way operation or any multiple-way operation which may be required.

It will also be observed that in any of the assemblies the flexible sealing member may be employed with assurance that it will make a fluid tight seal irrespective of inaccuracies in the manufacture of the valve seat members 18 and the valve seat members 19.

While I have shown and described the preferred embodiment of my invention, I do not desire to be limited to any of the details of construction shown and described herein, except as defined in the appended claims.

I claim:

1. In a valve structure, the combination of a movable valve member, a seat member upon which said movable member may seat, a tubular metallic flexible seal surrounding said movable member and extending therealong toward said seat member to engage said seat member and be flexed thereby into conformity with the shape of the surface of said seat to thereby provide a fluid tight seal between said members irrespective of the accuracy of the fit of said members to each other, and means mounting said tubular seal for limited movement along said movable member toward and away from said seat member independent of the position of said movable member relative to its seat member.

2. In a valve structure, the combination of a movable valve member, a seat member upon which said movable valve member may seat, a tubular metallic flexible seal surrounding said movable member and extending therealong toward said seat member to engage said seat member and be flexed thereby into conformity with the shape of the surface of said seat to thereby provide a fluid tight seal between said members irrespective of the accuracy of the fit of said members to each other, means mounting said tubular seal for limited movement along said movable member toward and away from said seat member independent of the position of said movable member relative to its seat member, and means providing for the urging of said seal toward said seat independent of the forces urging said movable member toward its seat.

3. In a valve structure, the combination of a movable valve member, a seat member upon which said movable member may seat, a tubular metallic flexible seal surrounding said movable member and extending therealong toward said seat member to engage said seat member and be flexed thereby into conformity with the shape of the surface of said seat to thereby provide a fluid tight seal between said members irrespective of the accuracy of the fit of said members to each other, means mounting said tubular seal for limited movement along said movable member toward and away from said seat member independent of the position of said movable member relative to its seat member, means providing for the urging of said movable valve member and said seal toward said seat member, and means on said seal member for limiting the proportion of said force which may be exerted upon said seal.

4. In a valve structure, the combination of a movable valve member, a seat member upon which said movable member may seat, a tubular metallic flexible seal surrounding said movable member and extending therealong toward said seat member to engage said seat member and be flexed thereby into conformity with the shape of the surface of said seat to thereby provide a fluid tight seal between said members irrespective of the accuracy of the fit of said members to each other, means mounting said tubular seal for limited movement along said movable member toward and away from said seat member independent of the position of said movable member relative to its seat member, and means providing for the urging of said seal toward said seat independent of the forces urging said movable member toward its seat, said seal having a relatively close fit about said movable member at a point spaced from the end of said seal engageable by said seat and having a relatively loose fit about said movable member adjacent said end whereby said seal is supported and pressed by contact along said movable member.

5. In a valve structure, the combination of a movable valve member, a seat member upon which said valve member may seat, a tubular flexible seal surrounding said movable member and extending therealong toward said seat member to engage said seat member to form a fluid tight seal between said members irrespective of accuracy of fit of said members to each other, a housing surrounding said members and said seal, and fluid passage means in said housing for subjecting said movable member and said seal to fluid pressure to urge said movable member and said seal into engagement with said seat member.

ALEX BERTEA.

REFERENCES CITED

The following references are of record in the file of this patent:

UNITED STATES PATENTS

| Number | Name | Date |
|---|---|---|
| 908,138 | Ricksecker, Jr. | Dec. 29, 1908 |
| 993,742 | Wardlaw | May 30, 1911 |
| 1,072,796 | Vance | Sept. 9, 1913 |
| 1,200,676 | Wiley | Oct. 10, 1916 |
| 1,568,057 | Carr | Jan. 5, 1926 |
| 1,861,420 | Mahan | May 31, 1932 |
| 1,868,138 | Fisk | July 19, 1932 |
| 2,009,845 | Farmer | July 30, 1935 |
| 2,192,339 | Wilson | Mar. 5, 1940 |
| 2,294,702 | Van Der Werff | Sept. 1, 1942 |
| 2,311,009 | Urquhart | Feb. 16, 1943 |
| 2,319,069 | Krone | May 11, 1943 |
| 2,329,576 | Anderson | Sept. 14, 1943 |
| 2,345,306 | Van Der Werff | Mar. 28, 1944 |
| 2,346,938 | Oravec | Apr. 18, 1944 |
| 2,351,190 | Carlson | June 13, 1944 |

FOREIGN PATENTS

| Number | Country | Date |
|---|---|---|
| 9,020 | Great Britain | 1899 |